US012617225B2

(12) United States Patent
Lott

(10) Patent No.: US 12,617,225 B2
(45) Date of Patent: May 5, 2026

(54) STATIONERY ORGANIZER

(71) Applicant: DeAnn Lott, San Leandro, CA (US)

(72) Inventor: DeAnn Lott, San Leandro, CA (US)

( * ) Notice: Subject to any disclaimer, the term of this patent is extended or adjusted under 35 U.S.C. 154(b) by 0 days.

(21) Appl. No.: 17/868,767

(22) Filed: Jul. 19, 2022

(65) Prior Publication Data

US 2023/0037830 A1 Feb. 9, 2023

Related U.S. Application Data

(60) Provisional application No. 63/223,077, filed on Jul. 19, 2021.

(51) Int. Cl.

| | |
|---|---|
| ***B64D 1/10*** | (2006.01) |
| ***B42D 1/10*** | (2006.01) |
| ***B42D 3/00*** | (2006.01) |
| ***B42F 3/04*** | (2006.01) |
| ***B42F 5/00*** | (2006.01) |
| ***B42F 11/00*** | (2006.01) |
| *A47B 23/00* | (2006.01) |

(52) U.S. Cl.

CPC ............... *B42D 1/10* (2013.01); *B42D 3/002* (2013.01); *B42F 3/04* (2013.01); *B42F 5/00* (2013.01); *B42F 11/00* (2013.01); *A47B 23/004* (2013.01); *B42P 2241/14* (2013.01)

(58) Field of Classification Search

CPC ...... B42F 5/00; B42F 3/04; B42F 1/00; B42F 3/00; B42F 11/00; B42D 1/10; B42D 3/002; A47B 23/004; B42P 2241/14

USPC ........................................................ 24/67 AR

See application file for complete search history.

(56) References Cited

U.S. PATENT DOCUMENTS

| | | | | | | |
|---|---|---|---|---|---|---|
| 40,260 | A | * | 10/1863 | Heyl | B42F 11/00 | 402/79 |
| 46,071 | A | * | 1/1865 | Burdon | B42D 3/002 | 281/21.1 |
| 260,372 | A | * | 7/1882 | Damborg | G10G 1/00 | 283/62 |
| 331,555 | A | * | 12/1885 | Scott | B42F 11/02 | 281/24 |
| 747,962 | A | * | 12/1903 | Gamble | B42F 11/02 | 281/24 |
| 757,990 | A | * | 4/1904 | Woodard | B42D 3/002 | 281/21.1 |
| 839,010 | A | * | 12/1906 | Lawrence | B42F 5/00 | 402/8 |

(Continued)

FOREIGN PATENT DOCUMENTS

| | | | | | |
|---|---|---|---|---|---|
| AT | 293224 B | * | 9/1971 | | B42F 5/00 |
| CN | 103249551 A | * | 8/2013 | | B32B 3/04 |

(Continued)

*Primary Examiner* — Taylor Morris

(74) *Attorney, Agent, or Firm* — Charlena Thorpe, Esq.; Incorporating Innovation LLC

(57) ABSTRACT

Implementations of a stationery organizer comprise one or more end strips, configured to attach a sheet of paper to a ring binder, and/or one or more intermediate strips, configured to connect and fold together sheets of paper. In some implementations, a method of using the stationery organizer comprises attaching a sheet of paper to an end strip on one side of the paper and to an intermediate strip on the other side of the paper, and further attaching another sheet of paper to the intermediate strip.

18 Claims, 5 Drawing Sheets

(56) References Cited

U.S. PATENT DOCUMENTS

| | | | | | |
|---|---|---|---|---|---|
| 1,023,715 | A * | 4/1912 | Bristol | B42F 11/00 | 402/79 |
| 1,047,567 | A * | 12/1912 | Richard | B42D 3/002 | 281/21.1 |
| 1,250,016 | A * | 12/1917 | Richards | B42F 1/02 | 206/820 |
| 1,253,206 | A * | 1/1918 | Bristol | B42F 13/12 | 402/75 |
| 1,291,382 | A * | 1/1919 | Bohan | B42F 1/02 | 24/DIG. 11 |
| 1,816,175 | A * | 7/1931 | Buchan | B42F 11/00 | 281/23 |
| 1,977,794 | A * | 10/1934 | Garraway | B42F 11/00 | 402/79 |
| 2,061,675 | A * | 11/1936 | Stanley | B42D 1/10 | 281/23 |
| 2,096,559 | A * | 10/1937 | Riley | B42F 5/00 | 16/225 |
| 2,238,332 | A * | 4/1941 | Lyman | A47B 23/004 | 150/147 |
| 2,291,003 | A * | 7/1942 | Stern | B41L 3/00 | 462/39 |
| 2,372,115 | A * | 3/1945 | Perry, Sr. | B42D 1/10 | 281/21.1 |
| 2,403,530 | A * | 7/1946 | Holtzman | B42F 5/00 | 206/460 |
| 2,510,263 | A * | 6/1950 | Stein | B42D 1/10 | 206/820 |
| 2,687,313 | A * | 8/1954 | Pisano | B42F 5/00 | 281/33 |
| 2,805,815 | A * | 9/1957 | Loetscher | B42D 15/08 | 229/92.1 |
| 2,860,774 | A * | 11/1958 | Ball | B42D 1/08 | 229/92.9 |
| 2,873,906 | A * | 2/1959 | Loetscher | B42D 15/08 | 229/92.1 |
| 2,873,907 | A * | 2/1959 | Loetscher | B42D 15/08 | 229/92.1 |
| 4,009,784 | A * | 3/1977 | Elias | B42F 15/0023 | 281/43 |
| 4,127,690 | A * | 11/1978 | Schleifenbaum | B42F 3/003 | 428/101 |
| 4,285,531 | A * | 8/1981 | Balsamo | B42F 3/00 | 428/137 |
| 4,371,195 | A * | 2/1983 | Wang | B42D 3/002 | 412/37 |
| 4,770,913 | A * | 9/1988 | Yamamoto | C09J 7/20 | 428/354 |
| 4,971,361 | A * | 11/1990 | Whiting | B42C 7/002 | 281/5 |
| 4,990,018 | A * | 2/1991 | Best | B42F 5/00 | 402/79 |
| 5,202,169 | A * | 4/1993 | Spendlove | C09J 7/20 | 412/37 |
| 5,248,164 | A * | 9/1993 | Lepretre | B42D 1/10 | 281/28 |
| 5,282,914 | A * | 2/1994 | Spendlove | B42F 1/00 | 24/304 |
| 5,291,990 | A * | 3/1994 | Sejzer | B65D 75/42 | 206/820 |
| 5,524,998 | A * | 6/1996 | Schwartz | B42D 13/00 | 281/38 |
| 5,683,194 | A * | 11/1997 | Emmel | B42F 11/00 | 281/38 |
| 5,806,677 | A * | 9/1998 | Storti | B42F 5/04 | 206/455 |
| 5,842,720 | A * | 12/1998 | Ward | B42F 3/006 | 281/38 |
| 6,047,990 | A * | 4/2000 | Mogelonsky | B42D 5/005 | 281/21.1 |
| 6,146,728 | A * | 11/2000 | Bay | B42F 11/00 | 156/196 |
| 6,427,838 | B1 * | 8/2002 | Fulda | B42F 5/00 | 206/455 |
| 7,437,994 | B1 * | 10/2008 | Ratzloff | B42F 11/00 | 402/79 |
| 7,723,600 | B2 * | 5/2010 | Braun | G09B 15/026 | 84/483.2 |
| 8,100,435 | B1 * | 1/2012 | Arkwright | B42F 11/00 | 428/40.1 |
| 9,193,211 | B2 * | 11/2015 | Nielsen | B42F 7/065 | |
| 2004/0164541 | A1 * | 8/2004 | Busatto | B42F 3/04 | 281/21.1 |
| 2005/0230957 | A1 * | 10/2005 | Holmberg | B42F 5/00 | 283/38 |
| 2005/0258631 | A1 * | 11/2005 | Funkhouser | B42D 1/10 | 281/21.1 |
| 2006/0104709 | A1 * | 5/2006 | Shrock | B42F 11/00 | 402/79 |
| 2007/0031180 | A1 * | 2/2007 | Grogan | B42F 11/00 | 402/8 |
| 2007/0085331 | A1 * | 4/2007 | Mueller | B42F 11/00 | 281/45 |
| 2008/0303263 | A1 * | 12/2008 | Blau | B42D 1/00 | 281/16 |
| 2009/0003923 | A1 * | 1/2009 | Osterheldt | B42F 21/06 | 402/22 |
| 2009/0243276 | A1 * | 10/2009 | Yang | B42D 3/002 | 281/29 |
| 2014/0209776 | A1 * | 7/2014 | Gorimaar | B42F 7/065 | 248/447 |
| 2019/0298058 | A1 * | 10/2019 | Greene | B42D 1/08 | |

FOREIGN PATENT DOCUMENTS

| | | | | |
|---|---|---|---|---|
| DE | 20109904 | U1 * | 11/2001 | B42F 11/00 |
| DE | 102005014497 | A1 * | 10/2006 | B42F 3/003 |
| EP | 1180438 | A1 * | 2/2002 | B42F 11/00 |
| GB | 191025765 | A * | 9/1911 | A47B 23/004 |
| WO | WO-8702941 | A1 * | 5/1987 | B42F 11/00 |
| WO | WO-9816398 | A1 * | 4/1998 | B42F 11/00 |
| WO | WO-2015173446 | A1 * | 11/2015 | B42F 11/00 |
| WO | WO-2024106804 | A1 * | 5/2024 | B42F 9/00 |

* cited by examiner

STATIONERY ORGANIZER

CROSS REFERENCE TO RELATED APPLICATION

This application claims the benefit of U.S. Patent Application Ser. No. 63/223,077, which was filed on Jul. 19, 2021, and is incorporated herein by reference in its entirety.

TECHNICAL FIELD

This disclosure relates to implementations of a stationery organizer for organizing loose sheets of paper or similar items.

BACKGROUND

As shown in FIG. 1, sheet music that musicians read from while practicing or performing is usually loose and difficult to manage. There does not exist a system and method that organizes such loose sheets of paper or similar items.

DETAILED DESCRIPTION

Implementations of a stationery organizer are provided. In some implementations, the stationery organizer comprises one or more end strips, configured to attach a sheet of paper to a ring binder, and/or one or more intermediate strips, configured to connect and fold together sheets of paper.

In some implementations, the stationery organizer is configured to organize loose sheets of paper or similar items (e.g., stationery).

In some implementations, the stationery organizer is configured to attach to one or more loose sheets of paper and attach to the rings in a binder such that the paper can be connected together and/or to the rings of the binder without putting holes in the paper.

In some implementations, the stationery organizer is configured to attach to loose sheets of paper such that the paper can be connected together in an accordion configuration that can be folded together and unfolded apart.

In some implementations, the stationery organizer is configured to attach to loose sheets of paper and attach to the rings in a binder such that the sheets of paper can be connected and folded together and stored attached to the rings in the binder.

In some implementations, the stationery organizer is configured to attach to loose sheets of paper and attach to the rings in a binder such that the sheets of paper can be unfolded and spread out from storage in the binder for access and/or viewing without detaching the paper from the rings of the binder (such as often needed for sheet music or other purposes).

In some implementations, a method of using the stationery organizer comprises attaching a sheet of paper to an end strip on one side of the paper and to an intermediate strip on the other side of the paper. In some implementations, the method further comprises attaching another sheet of paper to the intermediate strip such that the connected sheets of paper can be folded and unfolded by the intermediate strip and attached to a ring binder by the end strip.

Figure 1:
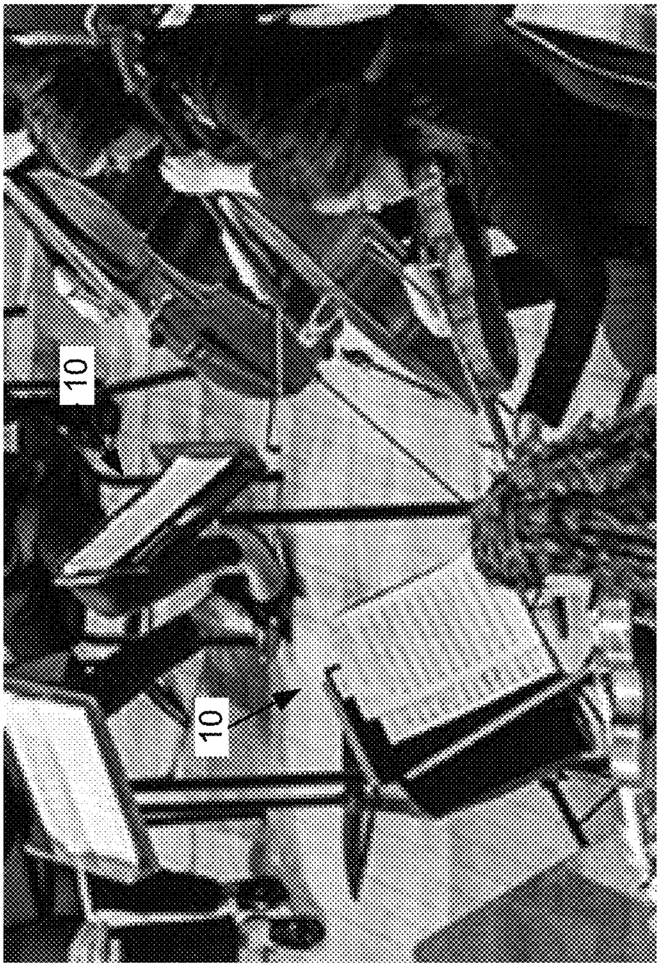
FIG. 1 (PRIOR ART)
FIG. 1 illustrates an example of loose sheets of paper or similar items that are difficult to organize and manage.

As shown in FIG. 1, sheet music that musicians read from while practicing or performing usually comprises loose sheets of paper 10 or similar items (e.g., stationery) that are difficult to organize and manage.

Figure 2:
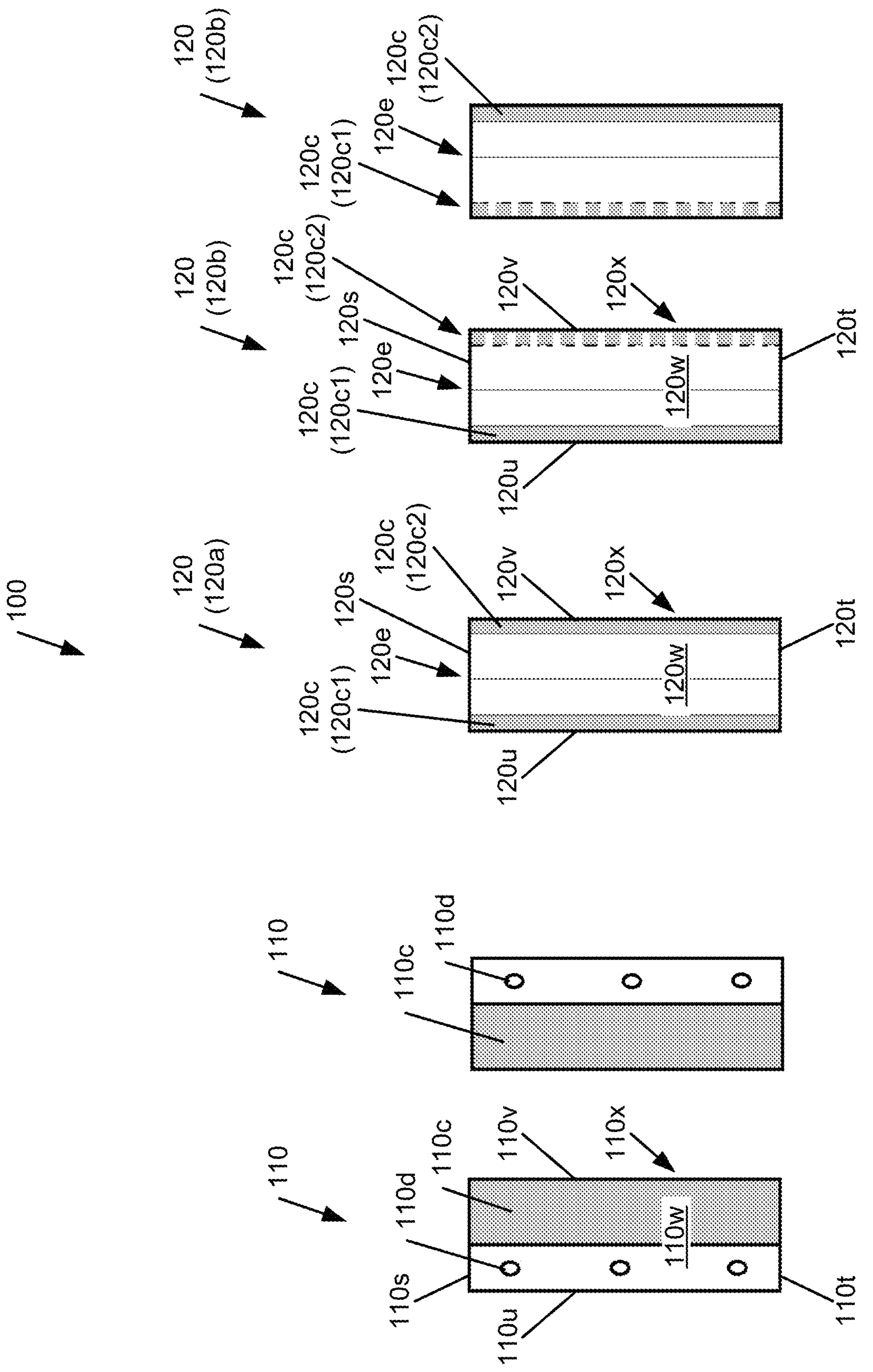
FIG. 2 illustrates implementations of an example stationery organizer according to the present disclosure.

FIG. 2 illustrates implementations of an example stationery organizer 100 according to the present disclosure. As shown in FIG. 2, in some implementations, the stationery organizer 100 comprises one or more end strips 110 and/or one or more intermediate strips 120 (120*a*, 120*b*).

In some implementations, the end strip 110 may comprise any suitable strip. For example, as shown in FIG. 2, in some implementations, the end strip 110 may comprise a generally flat, rectangular strip having a length, width, and thickness (or depth).

As shown in FIG. 2, in some implementations, the length of the end strip 110 may extend between a first (or top) side 110*s* and an opposite, second (or bottom) side 110*t*.

In some implementations, the width of the end strip 110 may extend between a third (or left) side 110*u* and an opposite, fourth (or right) side 110*v*.

In some implementations, the thickness of the end strip 110 may extend between a first (or front) surface 110*w* and an opposite, second (or back) surface 110*x*.

In some implementations, the end strip 110 may be any suitable length, width, and/or thickness. For example, in some implementations, the length of the end strip 110 may be generally the same or similar to the length of a sheet of paper or similar material (e.g. the paper 10 described for FIG. 1, i.e. an 8.5 inch width by 11 inch length or similarly sized sheet of paper).

In some implementations, the width of the end strip 110 may be a fraction of the width of a sheet of paper 10, such as a multiple of (e.g., two-times) the available side margin width of the paper 10 (e.g., approximately 0.25 inches to 1 inch). In some implementations, the width of the end strip 110 may be twice as wide as the width of an intermediate strip 120.

In some implementations, the thickness of the end strip 110 may be generally the same or similar to the thickness of a piece of cardstock (or card stock) paper or similar material (e.g., approximately 0.007 inches to 0.018 inches).

As shown in FIG. 2, in some implementations, the end strip 110 comprises an adhesive strip 110*c* and one or more holes 110*d*.

In some implementations, the adhesive strip 110*c* may comprise any suitable adhesive or similar component.

In some implementations, the adhesive strip 110*c* may be any suitable size and shape. For example, as shown in FIG. 2, in some implementations, the adhesive strip 110*c* may be generally rectangular shaped. In some implementations, the adhesive strip 110*c* may extend at least partly between the top and bottom sides 110*s*, 110*t* of the end strip 110. In some implementations, the adhesive strip 110*c* may extend partly between the left and right sides 110*u*, 110*v* of the end strip 110.

As shown in FIG. 2, in some implementations, the adhesive strip 110*c* may extend lengthwise adjacent to the right 110*v* or the left 110*u* side of the end strip 110 and opposite to the holes 110*d*. In some implementations, the adhesive strip 110*c* may be positioned on the front surface 110*w* of the end strip 110, or positioned on the back surface 110*x*.

In some implementations, the adhesive strip 110*c* may be in any other suitable position on the end strip 110 and extend in any other suitable way.

Figure 3A:
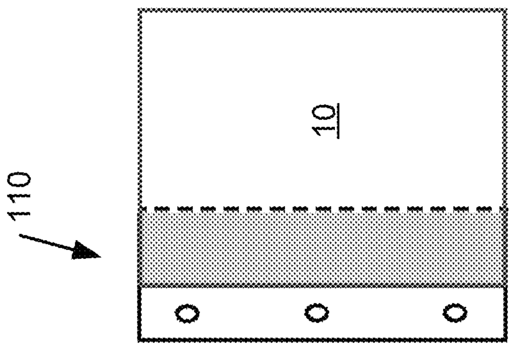
FIGS. 3A-3F illustrate an example use of the stationery organizer according to the present disclosure.
Figure 3B:
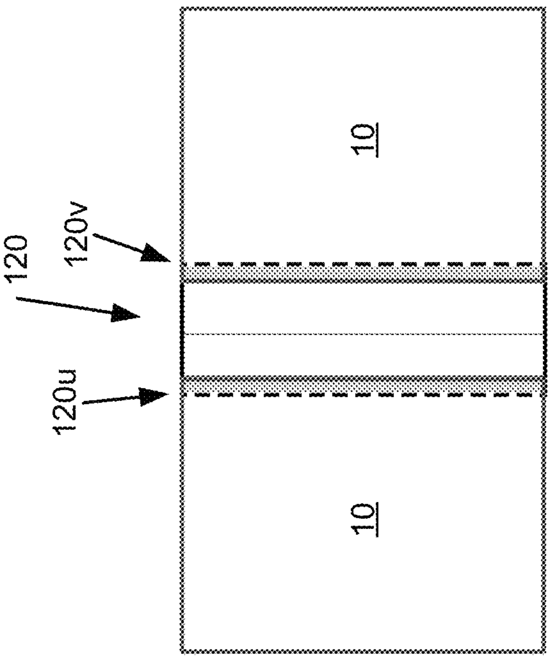
Figure 3C:
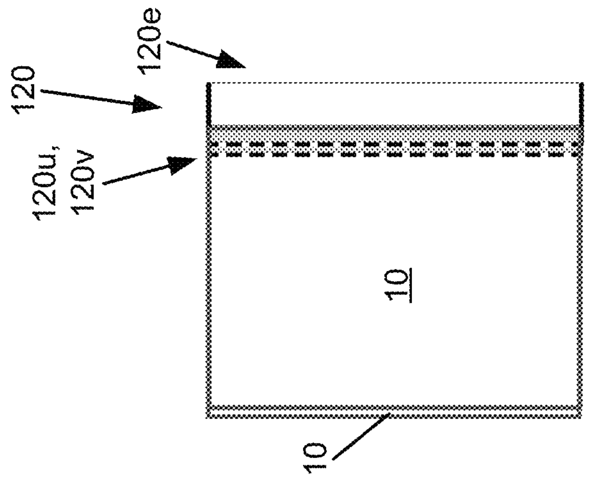
Figure 3D:
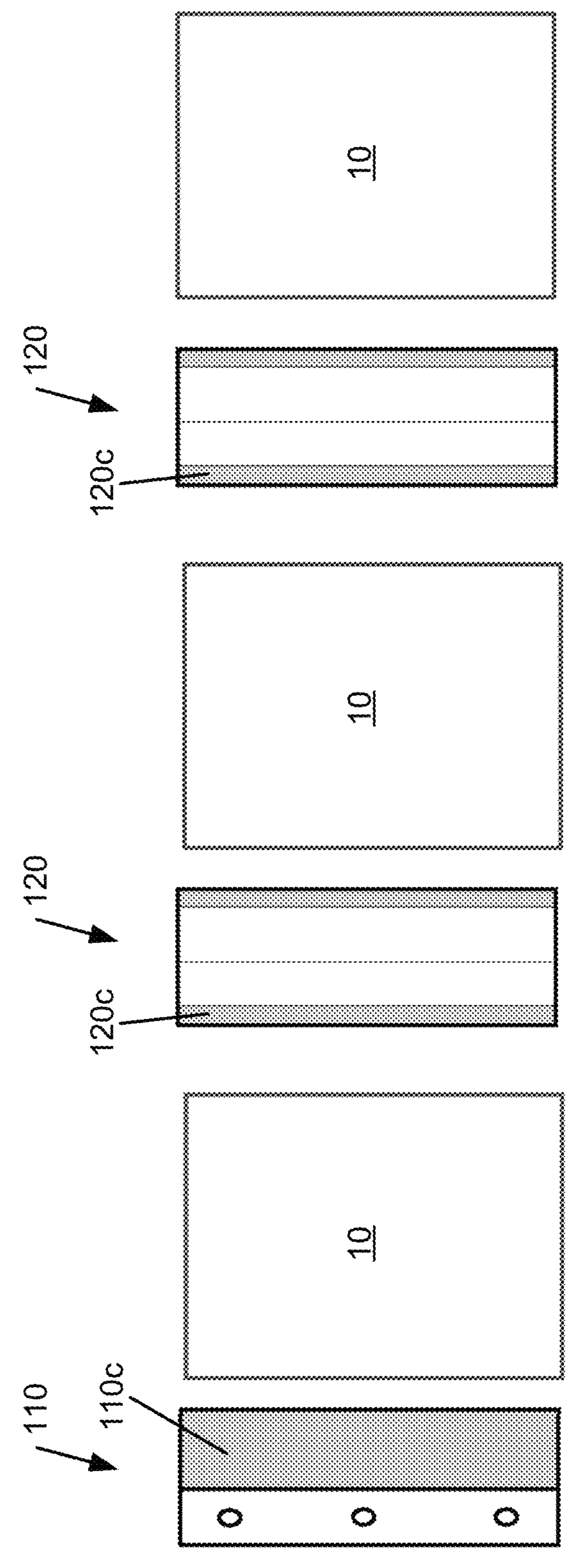
Figure 3F:
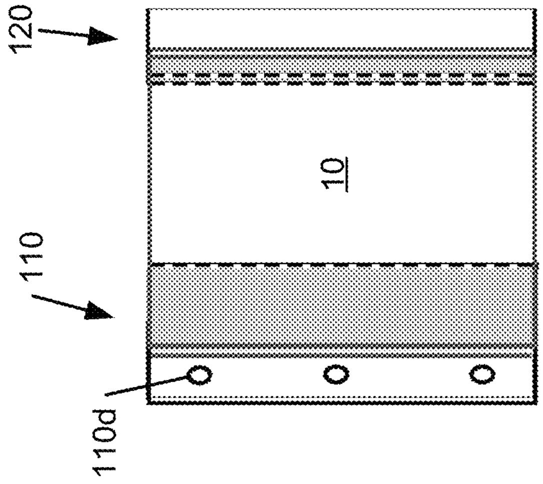
Figure 3E:
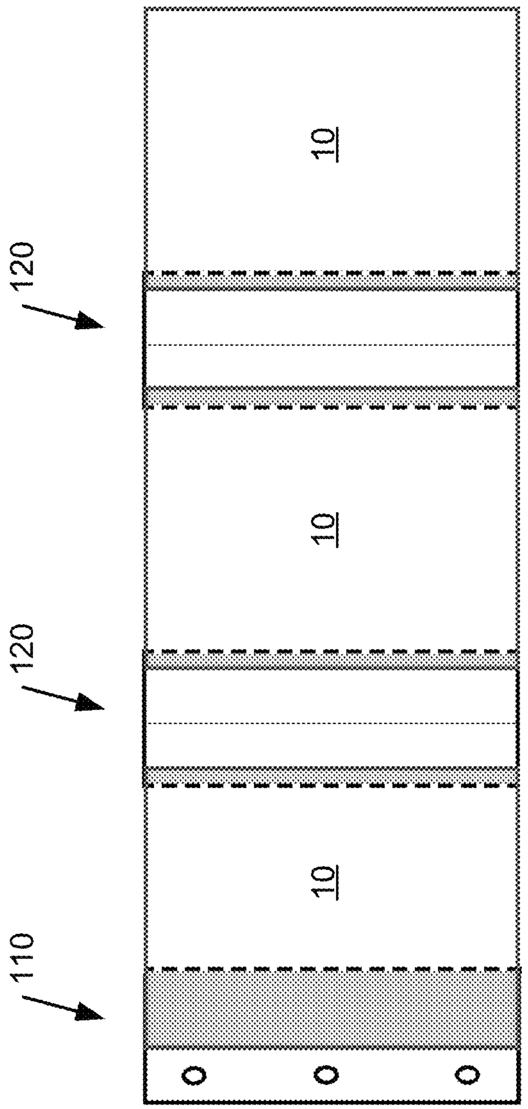

In some implementations, the adhesive strip 110*c* is configured to attach a sheet of paper (such as the paper 10 described above for FIG. 1, e.g. an 8.5 inch width by 11 inch length or similarly sized sheet of paper) to the end strip 110, such as shown in FIGS. 3A and 3E.

In some implementations, the adhesive strip 110*c* may further comprise a (removable, protective) covering. In some implementations, the covering can protect the adhesive strip 110*c*, e.g. from dirtiness or damage, before use of the end strip 110. In some implementations, the covering can be removed to allow the attachment of a sheet of paper to the adhesive strip 110*c* for use of the end strip 110.

In some implementations, the covering may be composed of a plastic or any other suitable material.

In some implementations, the holes 110*d* may be any suitable size and shape. For example, as shown in FIG. 2, in some implementations, the holes 110*d* may be generally circular shaped. In some implementations, the holes 110*d* may be aligned and extend at least partly between the top and bottom sides 110*s*, 110*t* of the end strip 110.

As shown in FIG. 2, in some implementations, the holes 110*d* may be aligned and extend lengthwise adjacent to the left 110*u* or the right 110*v* side of the end strip 110 and opposite to the adhesive strip 110*c*. In some implementations, the holes 110*d* may extend between and through the front surface 110*w* and the back surface 110*x* of the end strip 110.

In some implementations, the holes 110*d* may be in any other suitable position on the end strip 110 and extend in any other suitable way.

In some implementations, the holes 110*d* may be aligned and spaced to allow the end strip 110 to be attached to the rings in a multi-ring (e.g., three-ring) binder with a sheet of paper 10 attached to the end strip 110 by the adhesive strip 110*c*, such as shown in FIG. 3A.

As shown in FIG. 2, in some implementations, the end strip 110 may comprise three holes 110*d*. In some implementations, the end strip 110 may comprise more than three holes 110*d*. In some implementations, the end strip 110 may comprise less than three holes 110*d*.

In some implementations, the end strip 110 is configured to attach to a sheet of paper 10 by the adhesive strip 110*c* and attach to the rings in a binder by the holes 110*d* such that the paper 10 can be attached to the rings in the binder without hole punching the paper 10.

In some implementations, the intermediate strip 120 (120*a*, 120*b*) may comprise any suitable strip. For example, as shown in FIG. 2, in some implementations, the intermediate strip 120 may comprise a generally flat, rectangular strip having a length, width, and thickness (or depth).

As shown in FIG. 2, in some implementations, the length of the intermediate strip 120 may extend between a first (or top) side 120*s* and an opposite, second (or bottom) side 120*t*.

In some implementations, the width of the intermediate strip 120 may extend between a third (or left) side 120*u* and an opposite, fourth (or right) side 120*v*.

In some implementations, the thickness of the intermediate strip 120 may extend between a first (or front) surface 120*w* and an opposite, second (or back) surface 120*x*.

In some implementations, the intermediate strip 120 may be any suitable length, width, and/or thickness. For example, in some implementations, the length of the intermediate strip 120 may be generally the same or similar to the length of a sheet of paper or similar material (e.g. the paper 10 described for FIG. 1, i.e. an 8.5 inch width by 11 inch length or similarly sized sheet of paper).

In some implementations, the width of the intermediate strip 120 may be a fraction of the width of a sheet of paper 10, such as a multiple of (e.g., two-times) the available side margin width of the paper 10 (e.g., approximately 0.25 inches to 1 inch). In some implementations, the width of the intermediate strip 120 may be one-half as wide as the width of an end strip 110.

In some implementations, the thickness of the intermediate strip 120 may be generally the same or similar to the thickness of a piece of cardstock paper or similar material (e.g., approximately 0.007 inches to 0.018 inches).

As shown in FIG. 2, in some implementations, the intermediate strip 120 comprises a first and a second adhesive strip 120*c* (120*c*1, 120*c*2) and a fold-point 120*e*.

In some implementations, the adhesive strips 120*c* may comprise any suitable adhesive or similar component.

In some implementations, the adhesive strips 120*c* may be any suitable size and shape. For example, as shown in FIG. 2, in some implementations, the adhesive strips 120*c* may be generally rectangular shaped. In some implementations, the adhesive strips 120*c* may extend at least partly between the top and bottom sides 120*s*, 120*t* of the intermediate strip 120. In some implementations, the adhesive strips 120*c* may extend partly between the left and right sides 120*u*, 120*v* of the intermediate strip 120.

As shown in FIG. 2, in some implementations, the adhesive strips 120*c*1, 120*c*2 extend lengthwise adjacent to the left and right sides 120*u*, 120*v* respectively of the intermediate strip 120 and opposite to each other. In some implementations, the adhesive strips 120*c* of the intermediate strip 120*a* may be positioned on the front surface 120*w* of the intermediate strip 120, or positioned on the back surface 120*x*.

As shown in FIG. 2, in some implementations, one adhesive strip 120*c*1 of the intermediate strip 120*b* is positioned on the front surface 120*w* of the intermediate strip 120 and the other adhesive strip 120*c*2 of the intermediate strip 120*b* is positioned on the back surface 120*x* or vice versa.

In some implementations, the adhesive strips 120*c* may be in any other suitable position on the intermediate strip 120 and extend in any other suitable way.

In some implementations, the adhesive strips 120*c* (120*c*1, 120*c*2) are configured to attach a sheet of paper (such as the paper 10 described above for FIG. 1, e.g. an 8.5 inch width by 11 inch length or similarly sized sheet of paper) to the left and right sides 120*u*, 120*v* of the intermediate strip 120, such as shown in FIGS. 3B and 3E.

In some implementations, the adhesive strips 120*c* may further comprise a (removable, protective) covering. In some implementations, the covering can protect the adhesive strips 120*c*, e.g. from dirtiness or damage, before use of the intermediate strip 120. In some implementations, the covering can be removed to allow the attachment of a sheet of paper to the adhesive strips 120*c* for use of the intermediate strip 120.

In some implementations, the covering may be composed of a plastic or any other suitable material.

In some implementations, the fold-point 120*e* comprises any suitable feature in the intermediate strip 120 that allows the intermediate strip 120 to fold (and unfold) such that the left and right sides 120*u*, 120*v* of the intermediate strip 120 can be folded toward each other and/or folded together or near together (and conversely unfolded apart), such as shown in FIGS. 3C and 3F (folded) and FIGS. 3B and 3E (unfolded).

For example, in some implementations, the fold-point 120*e* may be a fold or bend. In some implementations, the fold-point 120*e* may be a scored portion of the intermediate strip 120.

In some implementations, the fold-point 120*e* may be any suitable size and shape. For example, as shown in FIG. 2, in some implementations, the fold-point 120*e* may be generally linear. In some implementations, the fold-point 120*e* may extend at least partly between the top and bottom sides 120*s*, 120*t* of the intermediate strip 120. In some implementations, the fold-point 120*e* may be positioned generally midway between the left and right sides 120*u*, 120*v* of the intermediate strip 120.

In some implementations, the fold-point 120*e* is configured to allow the intermediate strip 120 to fold and unfold as described above.

In some implementations, the intermediate strip 120 is configured to attach to a sheet of paper 10 by the adhesive strips 120*c* on each side 120*u*, 120*v* of the intermediate strip 120 such that the attached sheets of paper 10 are connected together by the intermediate strip 120, such as shown in FIGS. 3B and 3E.

In some implementations, the intermediate strip 120 is further configured to allow the attached sheets of paper 10 to fold toward each other and/or fold together by the fold-point 120*e*, such as shown in FIGS. 3C and 3F, and conversely to unfold apart.

In this way, in some implementations, the intermediate strip 120 can be used to arrange the attached sheets of paper 10 as desired while keeping the papers 10 together and organized. In some implementations, a plurality of intermediate strips 120 can be used to string together a plurality of loose sheets of paper 10 in an accordion configuration.

Furthermore, in this way, in some implementations, the intermediate strip 120 can be used to connect and fold together/unfold apart loose sheets of paper 10 without stapling together (or similarly attaching) or folding the paper 10.

In some implementations, the stationery organizer 100 is configured to organize loose sheets of paper or similar items (e.g., stationery).

In some implementations, the stationery organizer 100 is configured to attach to one or more loose sheets of paper 10 and attach to the rings in a binder such that the paper 10 can be connected together and/or to the rings of the binder without putting holes in the paper 10.

In some implementations, the stationery organizer 100 is configured to attach to loose sheets of paper 10 such that the paper 10 can be connected together in an accordion configuration that can be folded together and unfolded apart.

In some implementations, the stationery organizer 100 is configured to attach to loose sheets of paper 10 and attach to the rings in a binder such that the sheets of paper 10 can be connected and folded together and stored attached to the rings in the binder.

In some implementations, the stationery organizer 100 is configured to attach to loose sheets of paper 10 and attach to the rings in a binder such that the sheets of paper 10 can be unfolded and spread out from storage in the binder for access and/or viewing without detaching the paper 10 from the rings of the binder (such as often needed for sheet music or other purposes).

In some implementations, the stationery organizer 100 comprises any suitable dimensions, such as the example references and dimensions described above. For example, in some implementations, the end strips 110 and/or intermediate strips 120 may comprise any suitable dimensions that allow the stationery organizer 100 to attach to and organize loose sheets of paper or similar items. In some implementations, the dimensions may further be suitable to allow the stationery organizer 100 to be attached to the rings of a multi-ring (e.g., three-ring) binder while attached to the loose sheets.

In some implementations, the strips 110, 120 may be approximately 11 inches in length. In some implementations, the strips 110, 120 may be less than 11 inches in length. In some implementations, the strips 110, 120 may be greater than 11 inches in length.

In some implementations, the strips 110, 120 may be approximately 0.25 inches to 1 inch in width. In some implementations, the strips 110, 120 may be less than 0.25 inches in width. In some implementations, the strips 110, 120 may be greater than 1 inch in width.

In some implementations, the width of the end strip 110 may be twice as wide as the width of an intermediate strip 120. In some implementations, the width of the intermediate strip 120 may be one-half as wide as the width of an end strip 110.

In some implementations, the strips 110, 120 may be approximately 0.007 inches to 0.018 inches in thickness (or depth). In some implementations, the strips 110, 120 may be less than 0.007 inches in thickness. In some implementations, the strips 110, 120 may be greater than 0.018 inches in thickness.

In some implementations, the stationery organizer 100 is composed of any suitable materials. For example, in some implementations, the end strips 110 and/or intermediate strips 120 are composed of a cardstock (or card stock) material. In some implementations, the cardstock material may be at least partly coated or laminated, such as with a plastic or vinyl coating or lamination.

In some implementations, the end strips 110 and/or intermediate strips 120 may be at least partly composed of a clear or translucent material.

In some implementations, the adhesive may be any suitable adhesive or other suitable component.

In some implementations, the stationery organizer 100 can have any suitable appearance, such as the examples shown in the figures.

In some implementations, an example method of using the stationery organizer 100, with respect to the above-described figures, comprises attaching a loose sheet of paper 10 (such as the paper 10 described above for FIG. 1, e.g. an 8.5 inch width by 11 inch length or similarly sized sheet of paper) to an end strip 110 by the adhesive strip 110*c*, such as shown in FIG. 3A.

In some implementations, the method further comprises attaching the end strip 110, with the paper 10 attached, to the rings of a binder such that the paper 10 is attached to the rings of the binder without punching holes in the paper 10.

In some implementations, another example method of using the stationery organizer 110 comprises attaching a loose sheet of paper 10 to the intermediate strip 120 by each of the adhesive strips 120*c*1, 120*c*2 such that the attached sheets of paper 10 are connected together by the intermediate strip 120, such as shown in FIG. 3B.

In some implementations, the method further comprises folding the attached sheets of paper 10 together by the fold-point 120*e* to arrange and/or organize the sheets of paper 10, such as shown in FIG. 3C.

In some implementations, another example method of using the stationery organizer 110 comprises laying out a plurality of loose sheets of paper 10, at least one end strip

110 on one end of the layout, and an intermediate strip 120 in between the other sheets 10 in the layout, such as shown in FIG. 3D.

In some implementations, the method comprises attaching the sheets of paper 10 to the adjacent end strip 110 and intermediate strips 120 as arranged in the layout such that the sheets of paper 10 are connected together by the strips 110, 120, such as shown in FIG. 3E.

In some implementations, the method comprises folding the sheets of paper 10 together in an accordion configuration or similar configuration using the attached intermediate strips 120, such as shown in FIG. 3F.

In some implementations, the method may further comprise attaching the connected papers 10 on one end to the rings in a binder by the end strip 110.

In some implementations, the method may further comprise unfolding the connected papers by the intermediate strips 120 for access and/or viewing while the papers 10 remain attached to the rings in the binder by the end strip 110.

In some implementations, the method may further comprise arranging and/or organizing the sheets of paper 10 in any other suitable way using the stationery organizer 100.

The figures, including photographs and drawings, comprised herewith may represent one or more implementations of the stationery organizer.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A stationery organizer comprising:

an end strip comprising a first elongated strip of material having a first surface and a second surface, opposite the first surface wherein the end strip includes a plurality of openings extending lengthwise along a first side of the first elongated strip of material wherein each opening extends through the first elongated strip of material from the first surface to the second surface and wherein the end strip includes a first adhesive strip extending lengthwise along a second side of the first elongated strip of material wherein the second side is opposite the first side; and a first intermediate strip comprising a second elongated strip of material having a first surface and a second surface, opposite the first surface wherein the first intermediate strip includes a second adhesive strip extending lengthwise along a first side of the second elongated strip of material and a third adhesive strip extending lengthwise along a second side of the second elongated strip of material, wherein the second side is opposite the first side, wherein the first, second, and third adhesive strips are distinguishable from each other, wherein the first intermediate strip is scored lengthwise between the first side and the second side of the second elongated strip of material, and wherein the first intermediate strip includes no openings extending through the second elongated strip of material from the first surface to the second surface.

2. The stationery organizer of claim 1 wherein the second adhesive strip and the third adhesive strip are on the same surface of the second elongated strip of material.

3. The stationery organizer of claim 1 wherein the second adhesive strip and the third adhesive strip are on opposite surfaces of the second elongated strip of material.

4. A method of using a stationery organizer to connect a plurality of flexible sheets of paper together wherein each flexible sheet of paper has a first side and a second side, opposite the first side, the method comprising:

providing the stationery organizer of claim 1;

attaching a first flexible sheet of paper on its first side to the end strip using the first adhesive strip of the end strip, attaching the first flexible sheet of paper on its second side to the first intermediate strip using a second adhesive strip of the first intermediate strip, and attaching a second flexible sheet of paper on its first side to the first intermediate strip using the third adhesive strip of the first intermediate strip.

5. The method of claim 4 further comprising:

folding the first intermediate strip along the location in which it is scored.

6. The method of claim 4 further comprising:

attaching the first end strip to rings in a binder.

7. A method of using a stationery organizer to connect a plurality of flexible sheets of paper together wherein each flexible sheet of paper has a first side and a second side, opposite the first side, the method comprising:

providing the stationery organizer of claim 1;

using the second adhesive strip of the first intermediate strip to attach a second side of a first sheet of paper to the first side of the first intermediate strip, and using the third adhesive strip of the first intermediate strip to attach a first side of a second sheet of paper to the second side of the first intermediate strip.

8. The method of claim 7 further comprising:

folding the first intermediate strip along the location in which it is scored.

9. A method of using a stationery organizer to connect a plurality of flexible sheets of paper together wherein each flexible sheet of paper has a first side and a second side, opposite the first side, the method comprising:

providing the stationery organizer of claim 1;

using the first adhesive strip of a first end strip to attach a first sheet of paper on its first side to the first end strip, using the second adhesive strip of the first intermediate strip to attach the first sheet of paper on its second side to the first intermediate strip, using the third adhesive strip of the first intermediate strip to attach a second sheet of paper on its first side to the first intermediate strip, attaching the first end strip to rings in a binder; and folding the first intermediate strip along the location in which it is scored.

10. A method of using a stationery organizer to connect a plurality of flexible sheets of paper together wherein each flexible sheet of paper has a first side and a second side, opposite the first side, the method comprising:

providing the stationery organizer of claim 1;

using the second adhesive strip of the first intermediate strip to attach a first sheet of paper on its second side to the first intermediate strip, using the third adhesive strip of the first intermediate strip to attach a second sheet of paper on its first side to the first intermediate strip; and folding the first intermediate strip along the location in which it is scored.

11. A stationery organizer comprising:

one or more end strips and one or more intermediate strips wherein each end strip and each intermediate strip is loose wherein:

each end strip comprises an elongated strip of material for the end strip having a first surface and a second surface, opposite the first surface wherein the end strip includes a plurality of openings extending lengthwise along a first side of the elongated strip of material for the end strip wherein each opening extends through the elongated strip of material for the end strip from the first surface to the second surface and wherein the end strip includes a first adhesive strip extending lengthwise along a second side of the elongated strip of material for the end strip wherein the second side is opposite the first side; and each intermediate strip comprises an elongated strip of material for the intermediate strip having a first surface and a second surface, opposite the first surface wherein the intermediate strip includes a second adhesive strip extending lengthwise along a first side of the elongated strip of material for the intermediate strip and a third adhesive strip extending lengthwise along a second side of the elongated strip of material for the intermediate strip, wherein the second side is opposite the first side, wherein the first, second, and third adhesive strips are distinguishable from each other, and wherein the first intermediate strip includes no openings extending through the elongated strip of material for the intermediate strip from the first surface to the second surface.

12. A stationery organizer comprising:

an end strip comprising a first elongated strip of material having a first surface and a second surface, opposite the first surface wherein the end strip includes a plurality of openings extending lengthwise along a first side of the first elongated strip of material wherein each opening extends through the first elongated strip of material from the first surface to the second surface and wherein the end strip includes a first adhesive strip extending lengthwise along a second side of the first elongated strip of material wherein the second side is opposite the first side; and a first intermediate strip comprising a second elongated strip of material having a first surface and a second surface, opposite the first surface wherein the first intermediate strip includes a second adhesive strip extending lengthwise along a first side of the second elongated strip of material and a third adhesive strip extending lengthwise along a second side of the second elongated strip of material wherein the second side is opposite the first side, wherein the first, second, and third adhesive strips are distinguishable from each other, and wherein the second adhesive strip and the third adhesive strip are on opposite surfaces.

13. A method of using a stationery organizer to connect a plurality of flexible sheets of paper together comprising:

providing the stationery organizer of claim 12;

using the first adhesive strip of the end strip to attach a first sheet of paper on its first side to the end strip, using the second adhesive strip of the first intermediate strip to attach the first sheet of paper on its second side to the first intermediate strip, and using the third adhesive strip of the first intermediate strip to attach a second sheet of paper on its first side to the first intermediate strip.

14. The method of claim 13 wherein the first intermediate strip is scored lengthwise between a first side and a second side, the method further comprising:

folding the first intermediate strip along the location in which it is scored.

15. The method of claim 13 further comprising:

attaching the first end strip to rings in a binder.

16. A method of using a stationery organizer to connect a plurality of flexible sheets of paper together comprising:

providing the stationery organizer of claim 12;

using the second adhesive strip of the first intermediate strip to attach a first sheet of paper on its second side to the first intermediate strip, and using the third adhesive strip of the first intermediate strip to attach a second sheet of paper on its first side to the first intermediate strip.

17. The method of claim 16 further comprising:

folding the first intermediate strip lengthwise.

18. A method of using a stationery organizer to connect a plurality of flexible sheets of paper together comprising:

providing the stationery organizer of claim 12;

using the first adhesive strip of the end strip to attach a first sheet of paper on its first side to the end strip, using the second adhesive strip of the first intermediate strip to attach the first sheet of paper on its second side to the first intermediate strip, using the third adhesive strip of the first intermediate strip to attach a second sheet of paper on its first side to the first intermediate strip, attaching the first end strip to rings in a binder; and folding the first intermediate strip lengthwise.

* * * * *